US008699002B2

(12) United States Patent
Lee et al.

(10) Patent No.: US 8,699,002 B2
(45) Date of Patent: Apr. 15, 2014

(54) LASER IRRADIATION DEVICE AND METHOD OF MANUFACTURING ORGANIC LIGHT EMITTING DIODE DISPLAY DEVICE USING THE SAME

(75) Inventors: Seung-Mook Lee, Yongin (KR); Tae-Min Kang, Yongin (KR); Do-Young Kim, Yongin (KR); Beom-Joon Kim, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 600 days.

(21) Appl. No.: 12/461,657

(22) Filed: Aug. 19, 2009

(65) Prior Publication Data

US 2010/0045953 A1    Feb. 25, 2010

(30) Foreign Application Priority Data

Aug. 19, 2008  (KR) .................. 10-2008-0080860

(51) Int. Cl.
*G03B 27/62* (2006.01)
*G03B 27/54* (2006.01)
*G03B 27/32* (2006.01)

(52) U.S. Cl.
USPC ................................. 355/75; 355/67; 355/39

(58) Field of Classification Search
USPC ............ 355/53, 67, 77, 35, 39, 50, 74, 68, 75
See application file for complete search history.

(56) References Cited

U.S. PATENT DOCUMENTS

2005/0275819 A1* 12/2005 Tolbert et al. ................... 355/67
2006/0205101 A1   9/2006 Lee et al.
2007/0099100 A1*  5/2007 Finders et al. .................. 430/30
2008/0210888 A1*  9/2008 Inoue et al. ............... 250/492.22
2009/0207389 A1*  8/2009 Roberts et al. .................. 355/22

FOREIGN PATENT DOCUMENTS

| JP | 08-015656 | 1/1996 |
| JP | 2003-521728 | 7/2003 |
| KR | 1020060026788 | 3/2006 |
| KR | 1020060027742 | 3/2006 |
| KR | 1020070077249 | 7/2007 |
| KR | 2007-0107528 | 11/2007 |

OTHER PUBLICATIONS

Machine translation of KR 10-2007-0077249.*
Korean Office Action issued by Korean Patent Office on Mar. 31, 2010 corresponding Korean Patent Application No. 10-2008-0080860 and Request for Entry of the Accompanying Office Action attached herewith.

* cited by examiner

*Primary Examiner* — Peter B Kim
*Assistant Examiner* — Deoram Persaud
(74) *Attorney, Agent, or Firm* — Robert E. Bushnell, Esq.

(57) ABSTRACT

A laser irradiation device and a method of manufacturing an organic light emitting diode display device using the same. The laser radiation device prevents the scattering of the laser light into portions of the donor substrate that correspond to non-transmissive regions of a mask pattern. To reduce the scattering, the mask pattern is designed so that 1) non-transmissive regions of a surface of the mask pattern that faces the laser source have a reflective layer, 2) the surface of the mask pattern that faces the laser source is oriented to have a certain angle with respect to the laser beam axis, and 3) a surface of the mask pattern that faces the donor substrate has an anti-reflective layer. Each of these design aspects of the mask pattern prevents laser light from being scattered and prevents irradiating portions of the donor substrate that corresponds to a non-transmissive region of the mask pattern.

10 Claims, 3 Drawing Sheets

LASER IRRADIATION DEVICE AND METHOD OF MANUFACTURING ORGANIC LIGHT EMITTING DIODE DISPLAY DEVICE USING THE SAME

CLAIM OF PRIORITY

This application makes reference to, incorporates the same herein, and claims all benefits accruing under 35 U.S.C. §119 from an application for LASER IRRADIATION DEVICE AND METHOD OF MANUFACTURING ORGANIC LIGHT EMITTING DIODE DISPLAY DEVICE USING THE SAME earlier filed in the Korean Intellectual Property Office on 19 Aug. 2008 and there duly assigned Serial No. 10-2008-0080860.

BACKGROUND OF THE INVENTION

1. Field of the Invention

The present invention relates to a laser irradiation device and a method of manufacturing an organic light-emitting display (OLED) device via the laser irradiation device. The laser irradiation device and the method of manufacturing prevents portions of a donor substrate that correspond to a non-transmissive portion of a mask pattern from exposure to laser radiation that otherwise would occur due to scattering of a laser beam.

2. Description of the Related Art

Due to lightweight and thin characteristics, flat panel display devices have been used in place of cathode-ray tube display devices. Representative examples of flat panel display devices include a liquid crystal display (LCD) device and an OLED display device. The OLED display device can have superior luminance and superior viewing-angle characteristics as compared to the LCD device. The OLED display device can be implemented in an ultra-thin type design with no backlight. As described above, the OLED display device produces excitons by re-combining electrons and holes injected through a cathode and an anode in an organic thin layer and produces a specific wavelength of light based on the energy of the produced excitons.

OLED display devices are classified into either a passive matrix type or an active matrix type. The active matrix type includes a thin film transistor (TFT) circuit in its design. The passive matrix type is advantageous in that its display region is configured with a device having a simple matrix based on an anode and a cathode and therefore fabrication is simple. However, the passive matrix type is limited to small-sized display applications due to its low resolution, high operating voltage, short lifetime of materials, etc. In the active matrix type, a display region can exhibit stable luminance by including a TFT in each pixel and supplying a regular current to each pixel. In the active matrix type, high-resolution and large-sized displays can be produced due to low power consumption.

One method of forming red, green and blue (RGB) light emitting layers that implement full color in the OLED display device is by using a laser induced thermal imaging (LITI) method. The LITI method patterns a laser beam generated from a laser source using a mask pattern, forms patterned organic layer that includes a light emitting layer, irradiates, using the patterned laser beam, a donor substrate that includes a base substrate, a light to heat conversion layer, and a transfer layer that is an organic layer that includes the light emitting layer, and transfers a part of the transfer layer onto a device substrate. The LITI method is a dry process in which each light emitting layer can be precisely patterned.

The mask pattern of the laser irradiation device includes a transmissive region and a non-transmissive region, the non-transmissive region being produced by forming a scattering layer on a given region of a transparent substrate using an etching process. However, in the laser irradiation device using the mask pattern in which the scattering layer is formed in the non-transmissive region, laser radiation scatters into portions of the donor substrate that correspond to the non-transmissive region of the mask pattern, causing noise and interference. As a result, there is a problem in that an undesired region of the donor substrate is exposed to the laser beam due to this interference and noise.

SUMMARY OF THE INVENTION

The present invention relates to a laser irradiation device and a method of manufacturing an organic light-emitting display (OLED) display device. The laser irradiation device and the method prevents portions of a donor substrate that correspond to a non-transmissive portion of a mask pattern from exposure to laser radiation.

According to an exemplary embodiment, a laser irradiation device includes a laser source to generate a laser beam, a projection lens arranged at a lower portion of the laser irradiation device and a mask pattern arranged between the laser source and the projection lens, the mask pattern including a transmissive region and a non-transmissive region, wherein a surface of the mask pattern facing the laser source has a first inclined angle with respect to an optical axis of a laser beam, and wherein the mask pattern includes a reflective layer on the non-transmissive region of the surface of the mask pattern that faces the laser source.

The laser irradiation device can also include a beam homogenizer arranged between the laser source and the mask pattern, the beam homogenizer to homogenize the laser beam. The mask pattern can also include an anti-reflective layer arranged on a surface of the mask pattern facing the projection lens. The mask pattern can also include a laser beam absorber arranged on a surface thereof that faces the laser source, the laser beam absorber to absorb a laser beam reflected by the reflective layer of the mask pattern. The first inclined angle can be 1 to 45 degrees. The transmissive region of the mask pattern can include an aperture of which a side surface has a second inclined angle with respect to the surface of the mask pattern. The first inclined angle can be equal to the second inclined angle. The first and second inclined angles can be 1 to 45 degrees.

According to another aspect of the present invention, there is provided a method of manufacturing an organic light emitting diode display device, including providing a device substrate on which a first electrode is arranged, laminating a donor substrate having a base substrate, a light to heat conversion layer, and an organic layer as a transfer layer onto the device substrate, patterning a laser beam generated from a laser source via a mask pattern, the mask pattern having a surface that faces the laser source that forms a first inclined angle with respect to an optical axis of the laser beam, the mask pattern including a reflective layer arranged on a non-transmissive portion of the surface of the mask pattern facing the laser source, forming an organic layer pattern on the device substrate by irradiating a partial region of the donor substrate via the patterned laser beam, separating the donor substrate from the device substrate and forming a second electrode on the device substrate having the organic layer pattern.

A beam homogenizer can be further included between the laser source and the mask pattern, the beam homogenizer to homogenize the laser beam used to irradiate the donor substrate. The mask pattern can further include an anti-reflective layer arranged on a surface of the mask layer that faces the donor substrate. The mask pattern can further include a laser beam absorber arranged on the surface of the mask pattern facing the laser source, the laser beam absorber to absorb the laser beam reflected from the reflective layer of the mask pattern. The first inclined angle can be 1 to 45 degrees. The mask pattern can further include an aperture that corresponds to a transmissive region of the mask pattern, the aperture having a side surface that has a second inclined angle with respect to the surface of the mask pattern that faces the laser source. The first inclined angle can be equal to the second inclined angle. The first and second inclined angles can be 1 to 45 degrees.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
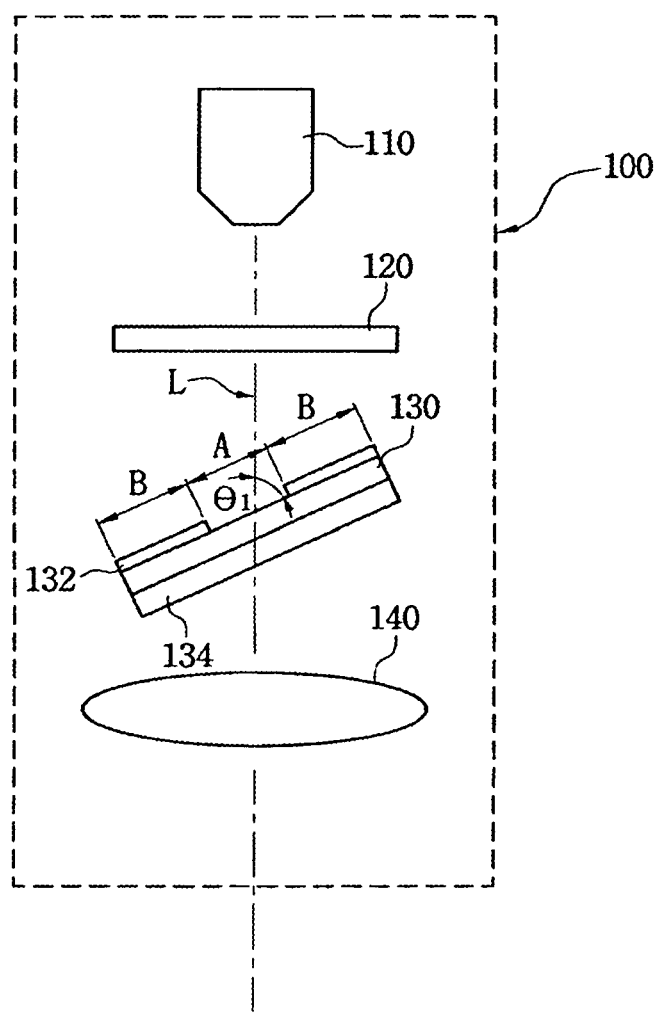
FIG. 1 is a schematic view illustrating a laser irradiation device according to a first exemplary embodiment of the present invention.

Reference will now be made in detail to exemplary embodiments of the present invention illustrated in the accompanying drawings, wherein the illustrated thicknesses of layers, films and regions may be exaggerated for clarity and like reference numerals refer to the like elements throughout. It is to be understood that the surface of the mask pattern that faces the laser source does not directly face the laser source as it is actually oriented at an angle, and this actually refers to a major surface of the mask pattern that is closest to the laser source. Likewise, the surface of the mask pattern that faces the projection lens and the donor substrate is actually a major surface of the mask pattern closest to the projection lens and the donor substrate.

First Exemplary Embodiment

Turning now to FIG. 1, FIG. 1 is a schematic view illustrating a laser irradiation device 100 according to a first exemplary embodiment of the present invention. Referring to FIG. 1, the laser irradiation device 100 includes a laser irradiation device 100, for generating a laser beam L, a projection lens 140 arranged at a lower portion of the laser source 110, and a mask pattern 130 for patterning the laser beam L, the mask pattern 130 being arranged between the laser source 110 and the projection lens 140. Here, the laser irradiation device 100 according to the first exemplary embodiment of the present invention can further include a beam homogenizer 120 arranged between the laser source 110 and the mask pattern 130, the beam homogenizer 120 homogenizes energy of the laser beam L.

FIG. 1 shows an example in which the mask pattern 130 includes a transmissive region A and a non-transmissive region B. Alternatively, the mask pattern 130 can instead include a plurality of transmissive regions A according to patterning conditions of the laser beam L. A reflective layer 132 is formed on a surface of non-transmissive region B of mask pattern 130 that faces the laser source 110. The surface of the mask pattern 130 facing the laser source 110 forms an angle $\theta_1$ with respect to an optical axis of the laser beam L to prevent laser radiation reflected by reflective layer 132 from colliding with the laser beam L being output from the laser source 110. Although not shown in FIG. 1, the laser irradiation device according to exemplary embodiments can further include a laser beam absorber (not shown) facing the reflective layer 132 of the mask pattern 130 such that the laser beam L reflected off the reflective layer 132 of the mask pattern 130 is absorbed.

When the first inclined angle $\theta_1$ increases, an area of the transmissive region A of the mask pattern 130 should be increased to irradiate the same area as the area of irradiation, though the mask pattern 130 has a smaller inclined angle. Accordingly, a total area of the mask pattern 130 also increases when first inclined angle $\theta_1$ increases. Since the area of the transmissive region A of the mask pattern 130 rapidly increases when the first inclined angle $\theta_1$ exceeds 45 degrees, the first inclined angle $\theta_1$ is between 1 and 45 degrees.

Another source of noise and interference occurs when either the projector lens 140 or the item being patterned reflects light of laser beam L. This reflected light can then be directed back to the mask pattern 130, be reflected off a side of mask pattern facing the projector lens 140, and then expose portions of the item being patterned that correspond to a non-transmissive region B of mask pattern 130. In order to prevent this from occurring, the present invention also includes an anti-reflective layer 134 on a surface of the mask pattern 130 facing the projection lens 140, an anti-reflective layer 134 preventing any laser light from reflecting therefrom.

Figure 2:
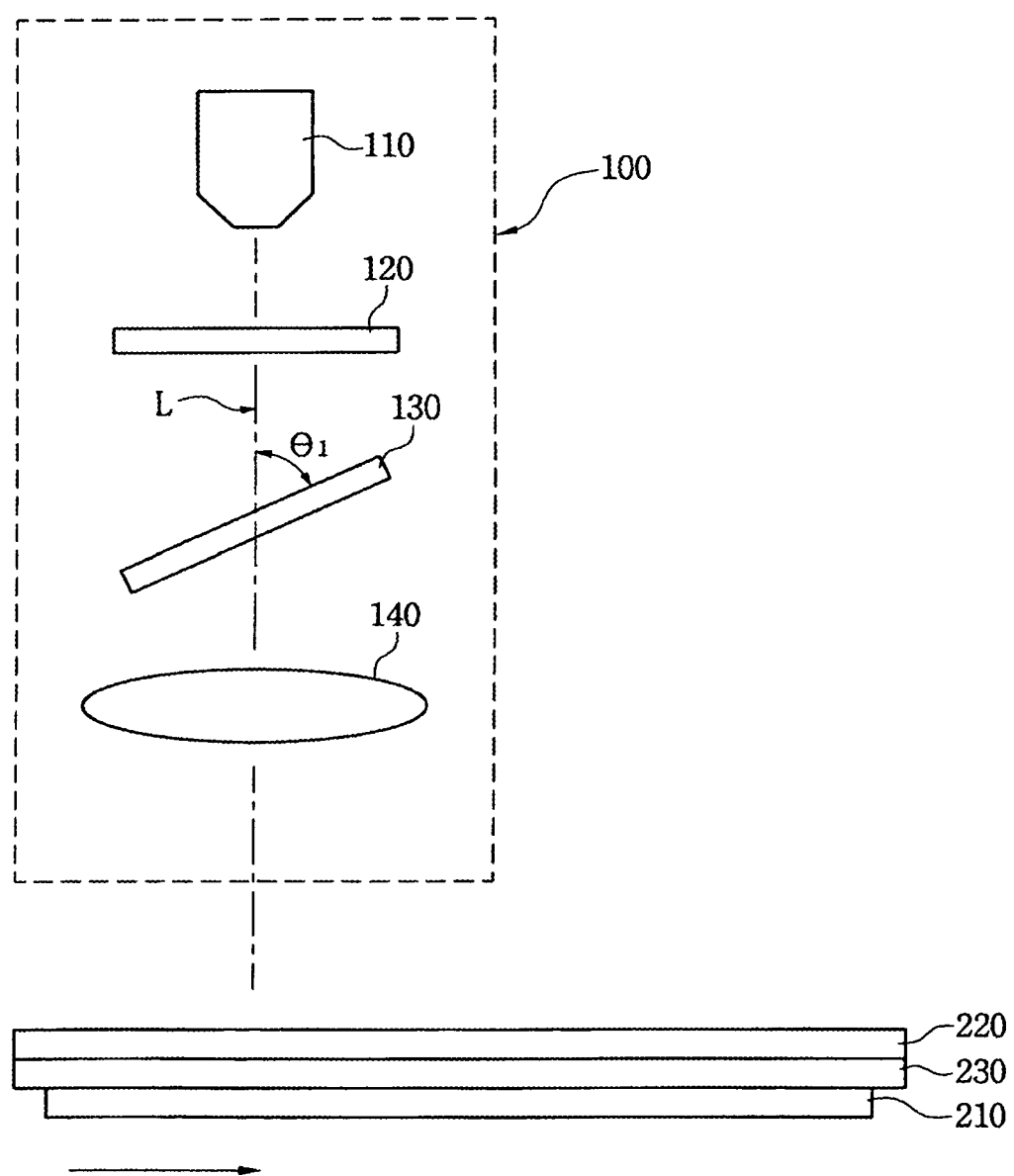
FIG. 2 is a schematic view illustrating a method of manufacturing an OLED display device using the laser irradiation device according to the first exemplary embodiment of the present invention.

Turning now to FIG. 2, FIG. 2 is a schematic view illustrating a method of manufacturing an OLED display device using the laser irradiation device 100 of FIG. 1. Referring to FIG. 2, a donor substrate 220, on which a transfer layer 230 is formed, is laminated on a device substrate 210 on which a first electrode is formed. Although not shown in FIG. 2, the donor substrate 220 includes a base substrate (not shown) and a light to heat conversion layer (not shown) and the transfer layer 230 includes an organic layer having a light emitting layer.

To irradiate a partial region of the donor substrate 220 by the laser beam L, the laser irradiation device 100 is arranged on the donor substrate 220. As described above, the laser irradiation device 100 includes the laser source 110 for generating the laser beam L, the beam homogenizer 120 arranged at the lower portion of the laser source 110, the projection lens 140 arranged at the lower portion of the beam homogenizer 120, and the mask pattern 130 arranged between the beam homogenizer 120 and the projection lens 140, the mask pattern 130 is oriented so that both major surfaces have a first inclined angle $\theta_1$ with respect to the optical axis of the laser beam L output from the laser source 110. Although not shown in FIG. 2, a reflective layer 132 (not shown in FIG. 2) is formed on the surface of the mask pattern 130 facing the laser source 110 and the beam homogenizer 120.

The laser irradiation device 100 patterns the laser beam L output from the laser source 110 by passing laser beam L through the mask pattern 130. The laser beam L patterned by the mask pattern 130 is used to irradiate a given region of the donor substrate 220 through the projection lens 140. Here, the mask pattern 130 includes a transmissive region and a non-transmissive region (not shown in FIG. 2). The laser beam L, with which the transmissive region A of the mask pattern 130 are irradiated, is used to irradiate the donor substrate 220 by passing laser beam L through the mask pattern 130 and the projection lens 140. Radiation from laser beam L impinging on non-transmissive region B of the mask pattern 130, is reflected from the reflective layer 132 formed on the surface of the mask pattern 130 facing the laser source 110.

The laser irradiation device 100 forms an organic layer pattern (not shown) on the device substrate 210 by scanning in the arrow direction of FIG. 2 and transferring a part of the transfer layer 230 to the device substrate 210. Here, a transfer process of the transfer layer 230 can be performed in a vacuum atmosphere in order to prevent the occurrence of bubbles between the device substrate 210 and the donor substrate 220. The OLED display device is produced by separating the donor substrate 220 from the device substrate 210 after forming the organic layer pattern on the device substrate 210, and forming a second electrode (not shown) on the organic layer pattern of the device substrate 210.

Consequently, the laser irradiation device 100 according to the first exemplary embodiment of the present invention prevents an undesired light emitting layer pattern, caused by laser beam scattering, from occurring. This laser scattering is reduced by 1) by forming the reflective layer 132 on a surface of the non-transmissive region B of the mask pattern 130 that faces the laser source 110, 2) by maintaining a certain inclined angle $\theta_1$ between the surface of the mask pattern 130 facing laser source 110 and an optical axis of the laser beam L, and 3) by including an anti-reflective layer 134 on a side of the mask pattern 130 facing the donor substrate 220.

Second Exemplary Embodiment

Figure 3:
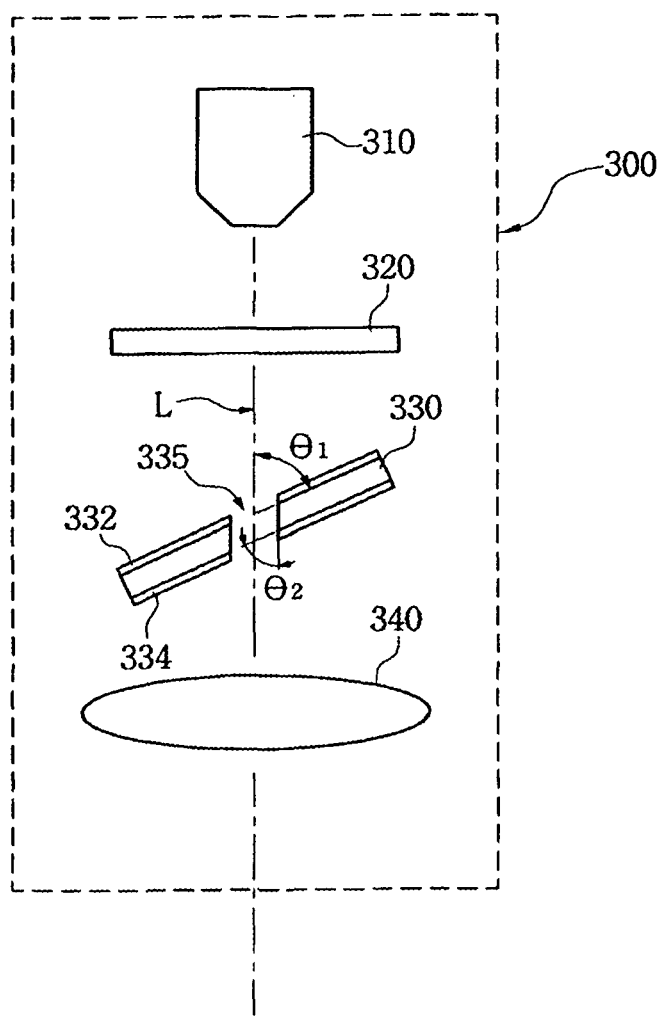
FIG. 3 is a schematic view illustrating a laser irradiation device according to a second exemplary embodiment of the present invention.

Turning now to FIG. 3, FIG. 3 is a schematic view illustrating a laser irradiation device 300 according to a second exemplary embodiment of the present invention. Referring to FIG. 3, a laser irradiation device 300 according to the second exemplary embodiment of the present invention includes a laser source 310 for generating a laser beam L, a projection lens 340 arranged at a lower portion of the laser irradiation device 300, and a mask pattern 330 arranged between the laser source 310 and the projection lens 340 and having an aperture 335 through which the laser beam L passes. Here, the laser irradiation device 300 according to the second exemplary embodiment of the present invention can further include a beam homogenizer 320 arranged between the laser source 310 and the mask pattern 330 for homogenizing energy of the laser beam L. In FIG. 3, the mask pattern 330 includes one aperture 335 that corresponds to a transmissive region. Alternatively, the mask pattern 330 can include a plurality of apertures 335 according to patterning conditions of the laser beam L.

Like the above-described mask pattern 130 of FIG. 1, the mask pattern 330 has a reflective layer 332 formed on a surface of the mask pattern 330 facing the laser source 310 and an anti-reflective layer 334 on a side of the mask pattern 330 facing the projector lens 340 and the donor substrate. In addition, like mask pattern 130 of the first embodiment, mask pattern 330 is oriented so that its major surfaces have a first inclined angle $\theta_1$ with respect to an optical axis of the laser beam L.

When the first inclined angle $\theta_1$ increases, an area of the aperture 335 of the mask pattern 330 should be increased to irradiate the same area as the area of irradiation, though the mask pattern 130 has a smaller inclined angle. Accordingly, the area of the mask pattern 330 also increases. Since the area of the aperture 335 of the mask pattern 330 seen by laser source 310 rapidly increases when the first inclined angle $\theta_1$ exceeds 45 degrees, the first inclined angle $\theta_1$ is preferably between 1 and 45 degrees.

To prevent the laser beam L passing through the aperture 335 of the mask pattern 330 from being refracted, a side surface of the aperture 335 of the mask pattern 330 can have a second inclined angle $\theta_2$ with respect to the surface of the mask pattern 330. The second inclined angle $\theta_2$ can be the same as the first inclined angle $\theta_1$.

On the surface of the mask pattern 330 facing the projection lens 340, an anti-reflective layer 334 is formed to prevent the surface of an irradiated object (e.g. the donor substrate) from being re-irradiated with the laser beam L when the laser beam L is reflected from either the projection lens 340 or from the surface of the irradiation object. Although not shown in FIG. 3, the laser irradiation device 300 according to the second exemplary embodiment of the present invention can further include a laser beam absorber (not shown) facing the reflective layer 332 of the mask pattern 330 so that the laser beam L reflected off the reflective layer 332 of the mask pattern 330 can be absorbed.

Consequently, the laser irradiation device 300 according to the second exemplary embodiment of the present invention prevents a laser beam from being scattered and irradiating portions of a donor substrate that correspond to a non-transmissive region of a mask pattern. This is achieved by including a reflective layer on one surface of the mask pattern while orienting the mask pattern so that the surface thereof facing the laser source forms a certain angle to the laser beam axis. Further reductions to laser light scattering can be achieved by including an anti-reflective layer on a side of the mask pattern facing the projection lens.

According to exemplary embodiments of the present invention, a laser irradiation devices and a method of manufacturing an OLED display device using the same can reflect a laser beam off a non-transmissive region of a mask pattern and prevent scattered laser radiation from impinging on portions of a donor substrate that correspond to the non-transmissive region of the mask pattern, thereby precisely controlling a pattern of the laser beam with which a donor substrate is irradiated.

While exemplary embodiments have been disclosed herein, it should be understood that other variations can be possible. Such variations are not to be regarded as a departure from the spirit and scope of exemplary embodiments of the present application, and all such modifications as would be obvious to one skilled in the art are intended to be included within the scope of the following claims.

What is claimed is:
1. A laser irradiation device, comprising:
a laser source to generate a laser beam;
a projection lens arranged at a lower portion of the laser irradiation device; and
a mask pattern arranged between the laser source and the projection lens, the mask pattern including a transmissive region and a non-transmissive region, wherein a surface of the mask pattern facing the laser source has a first inclined angle with respect to an optical axis of a laser beam, and wherein the mask pattern includes a reflective layer on the non-transmissive region of the surface of the mask pattern that faces the laser source, wherein the transmissive region of the mask pattern includes an aperture of which a side surface has a second inclined angle with respect to the surface of the mask pattern, wherein the first inclined angle is equal to the second inclined angle, wherein the first and second inclined angles are 1 to 45 degrees.

2. The laser irradiation device of claim 1, further comprising a beam homogenizer arranged between the laser source and the mask pattern, the beam homogenizer to homogenize the laser beam.

3. The laser irradiation device of claim 1, the mask pattern further comprising an anti-reflective layer arranged on a surface of the mask pattern facing the projection lens.

4. The laser irradiation device of claim 1, wherein the side surface of the aperture in the mask pattern extends in a direction that is parallel to the optical axis of the laser beam.

5. The laser irradiation device of claim 1, the side surface of the aperture of the mask pattern does not intercept the optical axis of the laser beam.

6. A method of manufacturing an organic light emitting diode display device, comprising:
   providing a device substrate on which a first electrode is arranged;
   laminating a donor substrate having a base substrate, a light to heat conversion layer, and an organic layer as a transfer layer onto the device substrate;
   patterning a laser beam generated from a laser source via a mask pattern, the mask pattern having a surface that faces the laser source that forms a first inclined angle with respect to an optical axis of the laser beam, the mask pattern including a reflective layer arranged on a non-transmissive portion of the surface of the mask pattern facing the laser source and an aperture that corresponds to a transmissive region of the mask pattern, the aperture having a side surface that has a second inclined angle with respect to the surface of the mask pattern that faces the laser source, the first inclined angle being equal to the second inclined angle, wherein the first and second inclined angles are 1 to 45 degrees;
   forming an organic layer pattern on the device substrate by irradiating a partial region of the donor substrate via the patterned laser beam;
   separating the donor substrate from the device substrate; and
   forming a second electrode on the device substrate having the organic layer pattern.

7. The method of claim 6, further comprising a beam homogenizer arranged between the laser source and the mask pattern, the beam homogenizer to homogenize the laser beam used to irradiate the donor substrate.

8. The method of claim 6, the mask pattern further comprising an anti-reflective layer arranged on a surface of the mask layer that faces the donor substrate.

9. The method of claim 6, wherein the side surface of the aperture in the mask pattern extends in a direction that is parallel to the optical axis of the laser beam.

10. The method of claim 6, the side surface of the aperture of the mask pattern does not intercept the optical axis of the laser beam.

* * * * *